United States Patent [19]
Gross et al.

[11] 3,932,212
[45] Jan. 13, 1976

[54] APPARATUS AND METHOD FOR DEPRESSURIZING, DEGASSING AND AFFORDING DECAY OF THE RADIOACTIVITY OF WEAKLY RADIOACTIVE CONDENSATES IN NUCLEAR POWER PLANTS

[75] Inventors: Rudolf Gross; Johann Plotz, both of Mulheim (Ruhr), Germany

[73] Assignee: Kraftwerke Union Aktiengesellschaft, Mulheim (Ruhr), Germany

[22] Filed: Mar. 11, 1974

[21] Appl. No.: 450,062

Related U.S. Application Data
[63] Continuation-in-part of Ser. No. 318,436, Dec. 26, 1972, abandoned.

[52] U.S. Cl............................ 176/37; 55/198
[51] Int. Cl.²........................ G21C 15/00
[58] Field of Search ............... 176/37, 38; 165/116; 55/198, 39, 54

[56] References Cited
UNITED STATES PATENTS

| | | | |
|---|---|---|---|
| 3,096,166 | 7/1963 | Kolthof et al. | 55/198 |
| 3,117,422 | 1/1964 | Bauer et al. | 176/37 |
| 3,431,168 | 3/1969 | Kjemtrup | 176/37 |
| 3,437,557 | 4/1969 | Kaipainer et al. | 176/38 |

*Primary Examiner*—Harvey E. Behrend
*Attorney, Agent, or Firm*—Herbert L. Lerner

[57] ABSTRACT

Apparatus for depressurizing, degassing and affording decay of weakly radioactive condensates in nuclear power plants having a turbine, and a main condenser turbine wherein exhaust steam of the turbine is condensed and forms a main condensate, and includes a collecting tank for the condensate situated below the condenser. A plurality of horizontal degassing channels, each having a lateral overflow, are disposed in the upper part of the condensate collecting tank and are filled with the main condensate up to the level of the overflow. At least one feedwater preheater which is heated by bleeder steam from the turbine provides a secondary condensate. Below the overflow height of the degassing channels extend horizontal feed pipes for the secondary condensate. The feed pipes are connected to the output of pressure relieving expanding devices and are provided on their underside with discharge openings for the bubbling of the secondary condensate into the main condensate to thereby degass the main condensate. The condensate collecting tank has mutually offset partitions therein providing an adequately long path for the decay of the main and secondary condensates. The condensate which is discharged from the condensate collecting tank is returned into the cycle as feedwater. Also disclosed is a method of operating the foregoing apparatus.

7 Claims, 5 Drawing Figures

APPARATUS AND METHOD FOR DEPRESSURIZING, DEGASSING AND AFFORDING DECAY OF THE RADIOACTIVITY OF WEAKLY RADIOACTIVE CONDENSATES IN NUCLEAR POWER PLANTS

This application is a continuation-in-part of Ser. No. 318,436, filed, Dec. 26, 1972, for METHOD AND APPARATUS FOR THE COMPRESSION, DEAERATION AND DECAY OF CONDENSATES IN STEAM POWER PLANTS, PARTICULARLY NUCLEAR POWER PLANTS, now abandoned.

The invention relates to apparatus and methods for depressurizing degassing and affording decay of the radioactivity of weakly radioactive condensates in nuclear power plants.

During the depressurization and degassing of condensates in nuclear power plants with boiling water reactors, particular difficulties occur through the fact that the condensate is weakly radioactive and such boiling water installations generally have no feed-water tank. For this reason, the condenser proper, which is connected behind the turbines, must be provided with a given storage space for the condensate wherein decay of the radioactivity of the condensate can also be afforded or attained. Due to the absence of a feed-water tank, special attention must be given to the discharge of secondary condensates which are produced, for example, from preheaters that are connected in the system.

It is a principal object of the invention to provide apparatus and method for the expansion or depressurizing and degassing of the collected condensate directly in the condenser and to afford, simultaneously, decay of the radioactivity of the condensate by providing appropriate storage means with decay paths.

Accordingly, the present invention relates to a method for depressurizing, degassing and affording decay of the radioactivity of weakly radioactive condensates in nuclear power plants having a turbine and a main condenser for the exhaust steam of the turbine, wherein the exhaust steam condenses in the main condenser and forms the main condensate, and at least one feed-water preheater which is heated by bleeder steam from the turbine, the condensate of this bleeder steam thereby forming a secondary condensate.

In accordance with the invention, the secondary condensate is guided through a depressurizing chamber which is connected in parallel with the main condenser and is kept at a higher pressure therefrom. Subsequently, the depressurized secondary condensate, is passed at higher pressure and at higher temperature, into the main condensate flowing out from the main condenser, where it is mixed, depressurized and vaporized so that the main condensate is degassed. Subsequently, both condensates are guided into a collector tank, having flow paths of adequate length, to permit decay of the radioactivity.

With the foregoing and other objects in view, there is provided in accordance with the invention, new and improved apparatus and method for depressurizing, degassing and affording decay of weakly radioactive condensates in nuclear power plants having a turbine, a main condenser for the exhaust steam of the turbine wherein the exhaust steam condensed in the main condenser forms a main condensate, a collecting tank for the condensate situated below the main condensate, and at least one feed-water preheater which is heated by bleeder steam from the turbine, the condensate of this bleeder steam forming a secondary condensate. A plurality of horizontal degassing channels which have a lateral overflow are disposed in the upper part of the condensate collecting tank and are filled with the main condensate up to the level of the overflow. Below the height of the overflow, horizontal feed pipes extend into the degassing channels. At least one pressure relieving device in form of a standpipe is connected in parallel with the main condenser and is connected by a line provided with a choke to the main condenser so that the secondary condensate is passed into the pressure relieving device and expanded or depressurized therein. The feed pipes are connected to the output of the pressure-relieving devices and provided on their underside with discharge openings for the introduction or bubling of the secondary condensate into the main condensate. The lower part of the condensate collecting tank has partitions which are provided with mutually offset partitions in order to provide an adequately long path for the decay of the main and secondary condensates. The condensate which is discharged from the condensate collecting tank is returnable into the cycle as feed-water. Since the secondary condensate is fed into these feed pipes at higher pressure and higher temperature than those of the main condensate, it can also flow into the main condensate through the openings formed on the underside of the pipes and will vaporize as a result of the sudden pressure drop, and rise to the surface of the main condensate in form of steam bubbles. Thus, a thorough degassing of the main condensate is also achieved.

According to another feature of the invention, additional secondary condensates which occur in the event of a disturbance, for example, in the steam generator, the decompressor for the feed pump, the steam overheater drain or in the emergency drains of the preheaters, are collected in separate pressure relieving devices connected in parallel with the main condenser, and are subsequently fed into the main condensate which had been drained from the main condenser. It is preferable, for this reason, that the feed pipes for the secondary condensate extend only about three quarters of the length of the degassing channels and have, in the region of the remaining length, inlets which communicate from below with the degassing channels, these inlets being connected to other depressurizing means connected in parallel with the main condenser. Into these other depressurizing means are fed additional secondary condensates, which may collect during a disturbance and which flow in, for example, from the steam overheating drain or an emergency drain of a preheater.

It is also preferable according to the invention to provide a main condenser which comprises in its center region separate air-cooling units which are covered by a cover plate with an open bottom. Below the air cooler units, diagonally inclined discharge chutes guide the oxygen-rich main condensate out of the air cooler units into a part of the degassing channels. Under the remaining main condenser pipes, are disposed additional diagonally tilted discharge chutes which pass the remaining main condensate into the other part of the degassing channels. Below all of the degassing channels is situated a diagonally inclined discharge plate on which, after discharging over the overflows, the oxygen-rich main condensate and the remaining main condensate are mixed.

Other features which are considered as characteristic for the invention are set forth in the appended claims.

Although the invention is illustrated and described herein as embodied in a particular embodiment, it is nevertheless not intended to be limited to the details shown, since various modifications may be made therein without departing from the spirit of the invention and the scope and range of equivalents of the claims.

The construction and method of operation of the invention, however, together with additional objects and advantages thereof will be best understood from the following description when read in connection with the accompanying drawings, in which.

Figure 1:
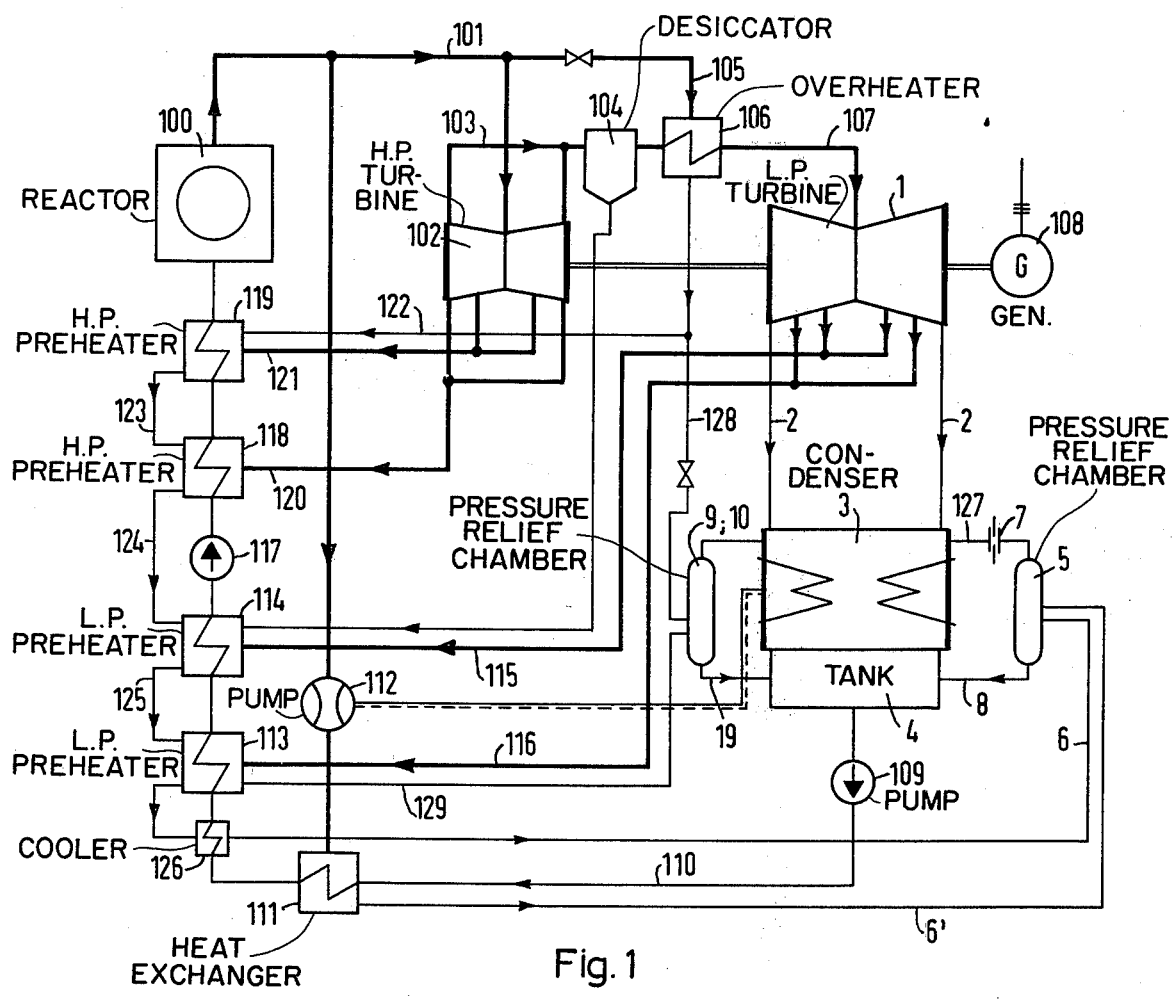
FIG. 1 is a schematic circuit diagram of the steam and water circulation system of a boiling water reactor, of the invention.

FIG. 1 shows the circuit diagram for a boiling water reactor. From the boiling water reactor 100, the generated saturated steam flows first through the line 101, to the saturated steam turbine 102 and, therefrom, through lines 103, into the steam desiccator 104 and through the intermediate overheater 106 which is heated by fresh steam, via bypass line 105. From this intermediate overheater, the steam arrives through line 107, in the low pressure turbine 1. The turbines 102 and 1 are seated on a common shaft and drive the generator 108. The exhaust steam of the low pressure part of turbine 1 is guided through the line 2, into the condenser and, here, following the condensation and collection in the condensate collecting tank 4, returned through the condensate pump 109, into the cycle, in form of feed-water. The feed-water then flows in the line 110, first in the heat exchanger 111 wherein the drive steam of the steam jet vacuum pump 112 gives off its heat to the feed-water. Thereafter, the feed-water passes through the low pressure preheaters 113 and 114 which are heated via bleeder steam lines 115 and 116, with bleeder steam from the low pressure turbine 1. The feed-water pipe 117, proper, is followed by the high pressure preheaters 118 and 119 which, by bleeder steam lines 120, 121 are heated with bleeder steam from the saturated steam turbine 102. A line 122 is connected into the last high pressure preheater 119 from the intermediate overheater 106 drain or discharge.

The condensates of the entire preheater path are gradually guided back through lines 123, 124 and 125, from preheater 119 to preheater 113. From the first low pressure preheater 113, the condensate is then guided through the condensate cooler 126 and the line 6, into the pressure relief chamber 5.

This so-called secondary condensate is utilized now, in accordance with the invention, for the degassing of the main condensate. The pressure relief chamber 5 which is shown as a vertical standpipe absorbs all constantly collecting secondary condensates such as, for example, the condensate from the preheater 111 which is guided through line 6' to the chamber 5. These secondary condensates collect at a higher pressure than the main condensate in the condenser 3. The chamber 5 is connected, by line 127, with the condenser 3, through a throttle or choke 7, installed into the line 127. The steam being collected in the chamber 5 is thereby guided directly back into the condenser 3 and is condensed therein. Through the choke 7, a slightly higher pressure than prevails in the condenser 3, is established in the chamber 5. Thus, for example, the condenser pressure may amount to 0.04 atmospheres at 28°C, while the secondary condensate in the decompressor 5 is under a pressure of 0.06 atmospheres at 35°. The water is therefore approximately at the boiling point.

Figure 2:
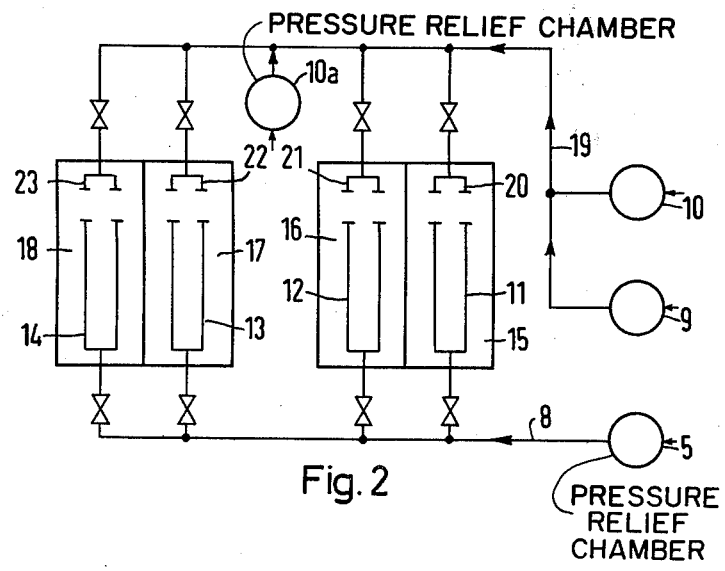
FIG. 2 is a schematic circuit diagram of means for guiding the secondary condensates.
Figure 3:
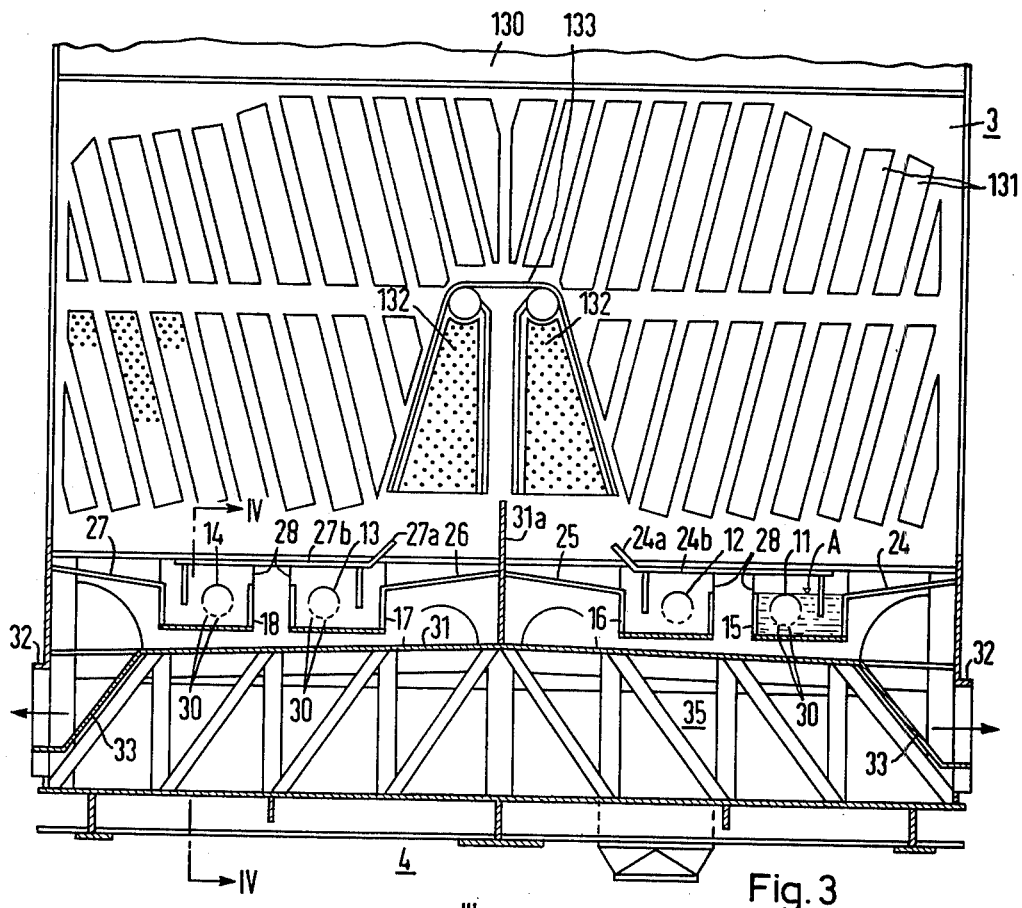
FIG. 3 is a cross section through a condenser system showing the condenser having a lower condensate collecting tank, taken along line III—III of FIG. 4.

Referring to FIG. 2, the remaining expansion of the secondary condensates and the simultaneous degassing of the main condensate is now effected in the degassing channels 15, 16, 17 and 18, which are schematically illustrated in FIG. 2 and in cross-section in FIG. 3. Depressurizing chambers 9, 10 and 10a, are connected through suitable valves and connectors 20 – 23 to channels 15 – 18.

FIG. 3 shows a cross-section through the entire condenser 3 with the condensate collecting tank 4 underneath. The exhaust steam from the low-pressure turbine 1 flows through the steam dome 130 towards the piping or baffles 131 of the condenser 3. This piping 131 which is cooled is divided into individual packages whose peripheries are shown in the drawn cross-section.

Also, the condenser has in its central lower portion an air cooler unit 132 where oxygen-rich condensate is precipitated. These air cooler units are disposed within a separate housing 133, open on the bottom. The degassing channels 15, 16 and 17, in which the condensate flows have on a longitudinal wall, an overflow edge 28, so that a condensate level A is created in these channels. Beneath the air cooler units 132, the guide baffles 25 and 26 are arranged so that the oxygen-rich condensate flows from these air cooler units 132, separately, toward the channels 16 and 17. The remaining condensate is caught on the right side by the baffles 24a and 24b and, on the left side, by the baffles 27 and 27b and are guided past channels 16 and 17 having the oxygen-rich condensate, into the channels 15 and 18. The condensate is then guided through baffles 24 and 27, from the external region into the channels 15 and 18.

In these channels 15 to 18, are arranged horizontal feed pipes 11, 12, 13 and 14, below the overflow edge 28, so that these feed pipes are disposed completely under the resulting condensate level. These feed pipes 11 to 14 are in contact by lines 8, (FIGS. 1, 2 and 4) with the depressurizing chamber 5, and pass the secondary condensate from the chamber 5, into these feed pipes 11 to 14. These pipes have discharge openings 30 on their undersides through which the secondary condensate, as previously indicated is at higher pressure and at higher temperature than the main condensate, can flow out. The pressure of the secondary condensate in the feed pipes 11 to 14 must be high enough that this secondary condensate will reliably bubble out downwardly from the openings 30 and overcome the pressure of the thereabove situated water column of the main condensate. The pressure of the secondary condensate in the chamber 5 is so adjusted that the pressure drop through the throttle or choke 7 and the water column of the main condensate disposed above the discharge openings 30, just about maintains a balance.

Following the discharge of the secondary condensate from the openings 30, it bubbles out and evaporates immediately due to the low pressure of the main condensate and thereby provides the degassing of the main condensate. The condensate running off from the overflows 28 is caught by a slightly inclined runoff sheet 31 and fed to an outlet discharge nozzle 32, by the inclined outlet 33 on the outside of the run-off sheet 31. Therefore, a mixing of the accumulating oxygen-rich condensate from the air cooler unit 132 and the remaining condensate, is effected on the run-off sheet 31.

In such a boiling water plant not only the constant secondary condensates are accumulated but, also, additional secondary condensates occurring in the event of a disturbance, if, for example, the load at generator 108 is suddenly disconnected or if other interferences occur. During such a disruption, additional secondary condensates accumulate in great amounts and are collected in separated pressure relief chambers 9, 10 and 10a (FIG. 2). These secondary condensates may arrive for example, via line 218, from the steam overheating run-off 106 or may arrive via emergency run-offs 129, from the lowest preheater 113 when such a preheater stops working and is bridged. Other, not specifically illustrated, disturbances which also produce a considerable accumulation of secondary condensates are, for example, the stoppage of the steam generator for the turbine or of the decompressor for the feed pump. These secondary condensates which collect during an interference, are collected in pressure relief standpipes 9 and 10 and are expanded to the pressure of the condenser 3.

Figure 4:
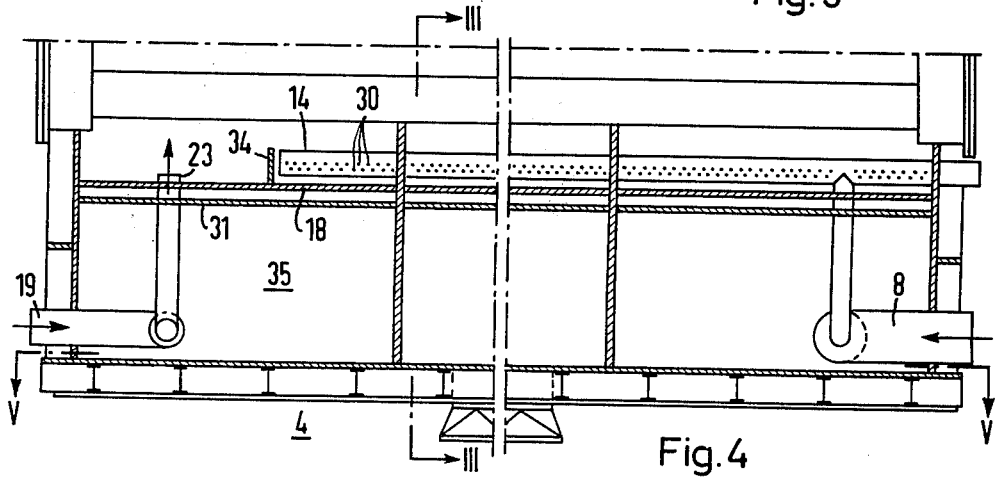
FIG. 4 is a longitudinal section through the condenser assembly lower part taken along line IV—IV of FIG. 3.

In order to mix the secondary condensates occurring during a disturbance, also with the main condensate, the arrangement as shown in FIG. 4 was provided. Here, the inlet pipes 11, 12, 13 and 14 extend only approximately about three-quarters of the total length of the degassing channels 15 to 18. The read ends of these channels 15 to 18 are separated by vertical baffles 34. In this area, separated by the baffles 34, the secondary condensates collect during a disturbance from pressure relief standpipes 9 and 10, FIGS. 1 and 2, are directly fed by pipe line 19 and the inlets 23 which open into the channel 18. Due to the greater amount accumulating during a disturbance, the degassing process which occurs during operation, is no longer possible and is not required.

By thus dividing the condenser into two halves, where each half is fully operable by itself, one-half of the condenser may be shut down in case of a leak in order to prevent cooling water from getting into the circuit. As will be seen in FIG. 3, the steam space above the run-off sheet 31 is divided into two halves by a partition 31a which extends transversely to the walls 36 but above the collecting space 35. At the outer ends, decay chamber 35 has condensate feed connections 44 and 45, and 46 and 47, respectively, which are connected with the outlets 32 for the condensate running off from the channels 15 to 18 via reversing lines, not shown.

Because in a boiling-water reactor the condensates are weakly radioactive, it is necessary to provide additionally for these condensates a decay section in which the condensates must remain for a definite time before they are returned to circulation via the condensate pumps. Accordingly, dwelling sections are obtained by the provision of a specially designed collecting space 35 disposed underneath the run-off sheets 31 in the lower part of the condenser 4.

Figure 5:
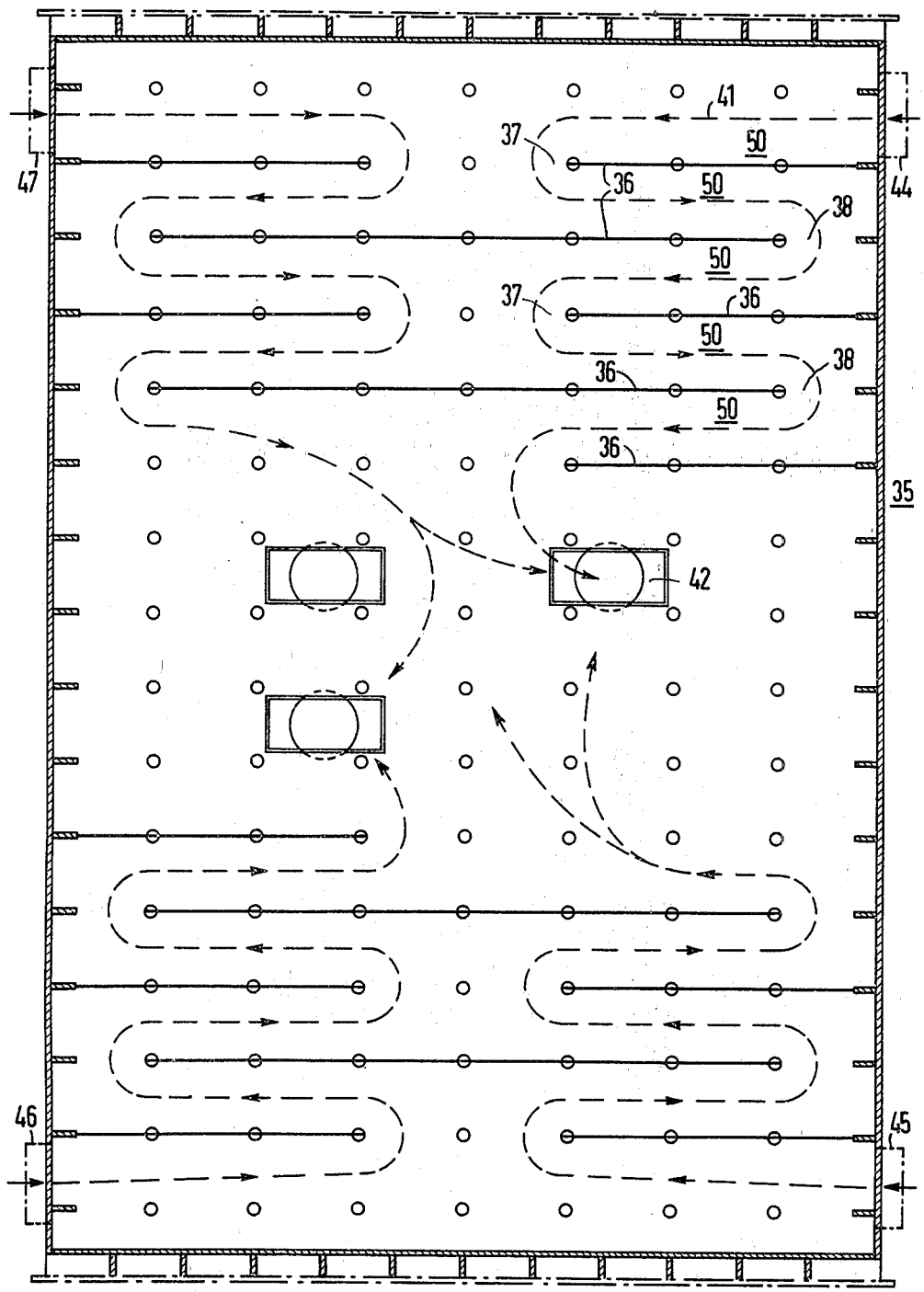
FIG. 5 is a horizontal section through the condensate collecting tank, taken along line V—V of FIG. 4.

As shown in FIG. 5, this collecting space 35 is subdivided by vertical partitions 36 into individual lanes. These partitions, however, have cutouts 37 and 38 which are staggered relative to one another, so that the condensates entering via inlets 44 to 47 are directed through the condenser collecting space 35 along winding or tortuous paths as indicated by the dashed lines 41 in FIG. 5. By providing this flow path for the condensate, a definite decay time for the radioactivity of the condensate is therefore obtained because of the longer flow time which is required. After flowing through this decay path, the condensate is fed to the main condensate pump via connections 42.

By the method and the apparatus according to the present invention, degassing of the condensate is, therefore, effected directly in the condenser, and an appropriate subdivision of the cooling pipes makes it possible to degas the oxygen-rich condensate which comes from the air cooler units separately from the rest of the condensate. In addition, a true separation of degassing and storage spaces has been obtained where the storage spaces themselves, due to appropriate design, additionally serve as the decay section for the radioactivity of the condensate. The arrangement described provides a very low structural height.

In operation in the turbine system as shown in FIG. 1 of the application, the main condensate of the exahust steam comes directly from turbine 1 collects in the condenser 3. In addition, the turbine system includes so-called secondary condensates which flow from the individual preheater stages or from steam-jet ejectors. Since, for the preheating of the feed water, bleeder steam is taken from higher pressure stages of the turbine as the heating medium, the condensate of the bleeder steam, after flowing from the individual preheaters, exhibits a higher pressure and higher temperature than the main condensate in the condenser 3. Both condensates consist of water. The secondary condensates coming from the preheater stages are fed through the lines 6 to the members 5. The pressure relieving standpipes 5 are connected with the main condenser 3 by means of a conduit provided with a choke 7. Since, in the standpipes 5, due to the higher pressure of the secondary condensates, a higher pressure prevails than in the condenser 3, suitable adjustment of the choke 7 can result in a lower pressure in the standpipes 5. Therefore, a depressurization of the secondary condensates takes place. In addition to the standpipes 5, there are also provided standpipes 9, 10 and 10a, wherein secondary condensates are collected which are produced in the event of a disturbance. Such a disturbance, may, for example arise when a preheater is defective and is disconnected and must be bridged by a bypass line. Condensate is produced also in this case, particularly from so-called mixing preheaters. This condensate produced in the event of a disturbance should be collected separately.

The condensate flowing from condenser 3 is now collected in degassing channels 15 to 18. The secondary condensate from standpipe 5 is conducted into the individual pipes 11 to 14 through line 8. These pipes are provided with openings at their underside, through which the secondary condensate flows into the main condensate. However, since the secondary condensate exhibits a higher pressure and higher temperature than the main condensate, it will immediately vaporize upon leaving pipes 11 to 14 and rise to the surface in the form of steam bubbles. Since the secondary condensate has a higher temperature than the main condensate, the main condensate is thereby heated to the point where it practically begins to boil, so that in this way an additional deaeration of the main condensate is assured.

Regarding the feeding of the various condensates, that is, the oxygen-enriched condensate from the air coolers and the remaining main condensate, it must be noted that this is not done selectively but these two condensates are produced continuously and in each case at the same location. The oxygen-enriched condensate drips onto the run-off baffles 25 and 26 and thus is fed to the channels 16 and 17, whereas the remaining main condensate falls upon the remaining surface, that is, baffles 27a and 27b as well as 27, and is conducted from there into the degassing channels 15 and 18. Conduction of the condensate from the run-off surfaces 25 and 26 onto the baffle 27 is not provided for. Rather, the condensates collect only after running over the overflow baffles 28 onto the run-off sheet 31 where they are mixed. During this running off, a further degassing takes place, to a small extent. All condensates caught by the run-off baffles 26, 27, 27a and 27b, come from the main condenser 3. Only the secondary condensates come from the line 8 and are fed therefrom through the pipes 11 – 14 from which the secondary condensates emerge.

We claim:

1. Method for depressurizing, degassing and affording decay of weakly radioactive condensates in a steam nuclear power plant of the type having a turbine with higher and lower pressure stages and a main condenser for condensing exhaust steam from the turbine to a main condensate, and at least one feed-water preheater heatable by bleeder steam fed thereto from a higher pressure stage of the turbine, the condensate of said bleeder steam constituting a secondary condensate, which comprises the steps of: feeding the secondary condensaate at a higher temperature and higher pressure than the main condensate into the main condensate so that the secondary condensate vaporizes in the main condensate with simultaneous degassing of the main condensate by the vaporizing of the secondary condensate, and thereafter passing both main and secondary condensates through a flow path of sufficient length to permit the radioactivity to decay.

2. The method of claim 1 including the step of first feeding the secondary condensate to a pressure relief chamber while still maintaining said secondary condensate at a higher pressure than said main condensate.

3. Method according to claim 2 which includes conducting the feed-water through a flow path that bypasses the preheater, heating the bypassing feed-water by means of bleeder steam from a higher pressure stage of the turbine thereby to produce additional secondary condensate, feeding the additional secondary condensate to another pressure relief chamber and feeding the additional secondary condensate from the other standpipe into the main condensate wherein the additional secondary condensate vaporizes.

4. Apparatus for depressurizing, degassing and affording decay of weakly radioactive condensates in a steam nuclear power plant of the type having a turbine, a main condenser for condensing exhaust steam from the turbine to a main condensate, a tank for collecting the main condensate below the level of the turbine, and at least one feed water preheater heatable by bleeder steam fed thereto from a higher pressure stage of the turbine, the condensate of said bleeder steam constituting a secondary condensate that is at higher temperature and higher pressure than the main condensate because of the origin thereof from said higher pressure stage of the turbine, comprising: a plurality of degassing channels each provided with a lateral overflow, said channels being provided in the upper part of the collecting tank for filling with the main condensate up to the level of the overflows, horizontal feed pipes arranged in said channels below the overflows, at least one pressure relieving standpipe for receiving said secondary condensate, said horizontal feed pipes communicating with said standpipe and having openings at a lower portion thereof, said collecting tank having a lower part provided with partitions having cutouts which are staggered relative to one another thereby to provide a flow path of sufficient length to permit the radioactivity of the condensates to decay, and a run-off sheet communicating between the upper and said lower part of said collecting tank.

5. Apparatus according to claim 4, comprising air cooler units for the main condensate which cause the main condensate to become oxygen-enriched, run-off baffles arranged to conduct the oxygen-enriched main condensate to certain ones of said degassing channels, means for conducting the remaining main condensate to other ones of said degassing channels, whereby a mixing of the oxygen-enriched main condensate and the remaining main condensate takes place on the run-off sheet.

6. Means for the depressurizing, degassing and decay of weakly radioactive condensates in nuclear power plants of the type having a turbine, and a main condenser for the exhaust steam of the turbine whereby the exhaust steam condensed in the main condenser forms a main condensate and a collecting tank for the condensate is situated below the condenser and a source of secondary condensate: comprising a plurality of horizontal degassing channels which have a lateral overflow arranged in the upper part of said condensate collecting tank and adapted to be filled with the main condensate up to the level of the overflow, horizontal feed pipes extending in said channels below the overflow height of the degassing channels, said feed pipes being provided on their underside, with discharge openings for the bubbling of the secondary condensate into the main condensate.

7. Apparatus as in claim 6 wherein said condensate collecting tank has partitions which are provided with mutually displaced partitions in order to provide an adequately long path for the decay of the main and secondary condensates, the condensate which is discharged from the condensate collecting tank being returnable into the cycle as feed-water.

* * * * *